Jan. 10, 1956  H. KATZUNG  2,730,355
STABILIZING WHEEL SUSPENSION FOR MOTOR VEHICLES
Filed Oct. 1, 1952
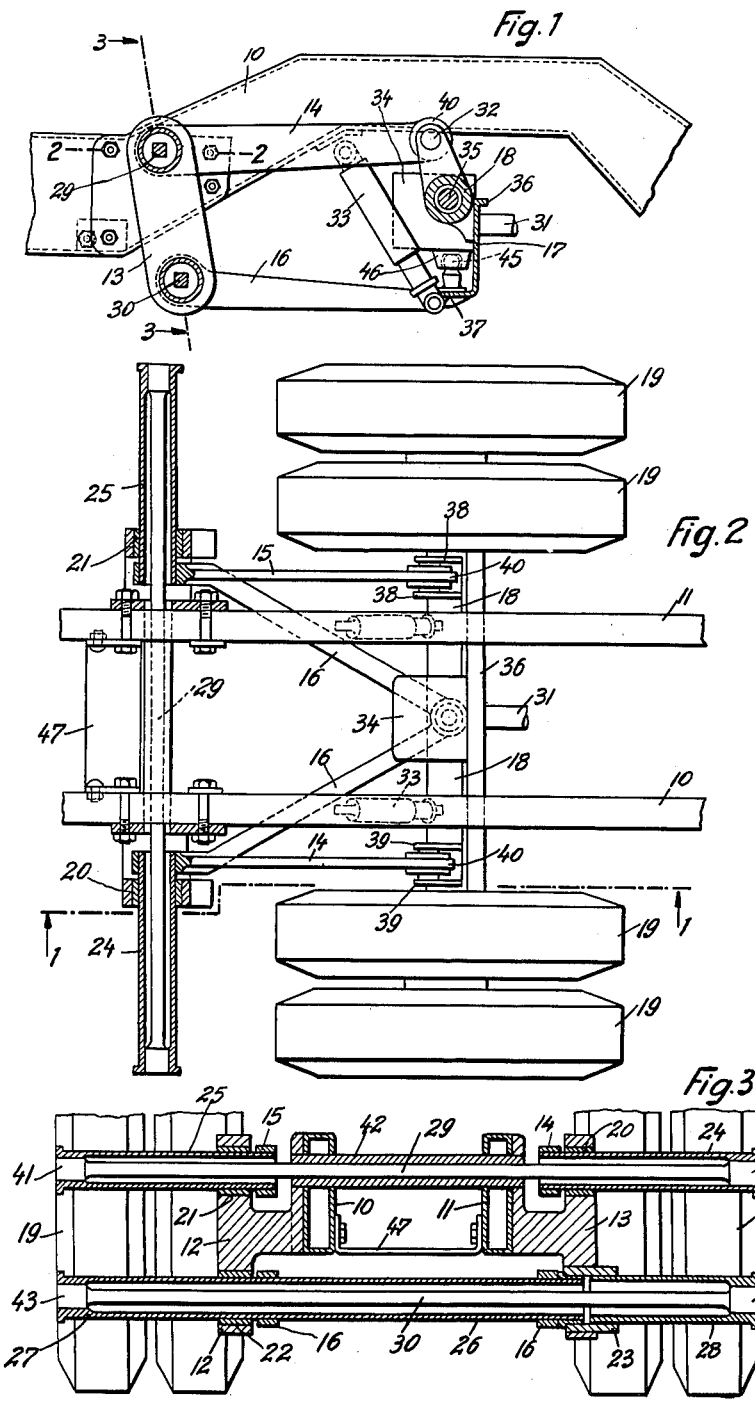
Inventor
Hugo Katzung
By Hicke & Padlon
Attorneys United States Patent Office 2,730,355
Patented Jan. 10, 1956

2,730,355
STABILIZING WHEEL SUSPENSION FOR MOTOR VEHICLES

Hugo Katzung, Stuttgart-Vaihingen, Germany, assignor to Daimler-Benz Aktiengesellschaft, Stuttgart-Unterturkheim, Germany Application October 1, 1952, Serial No. 312,587

10 Claims. (Cl. 267—11)

The present invention relates to a wheel suspension for vehicles, particularly for busses or other heavy duty vehicles having twin wheels.

In a vehicle in which the body is supported by spring-controlled elements on an axle on which a pair of wheels is mounted, the tendency of the body to lean over in curves depends largely on the distance of such elements and is enhanced by a reduction of such distance. When twin wheels are mounted on the axle, however, the considerable width of such twin wheels results necessarily in a reduction of the distance of the spring-controlled suspension means supporting the body on the axle. As a result, the springs dimensioned with respect to the relative up-and-down movement of the axle and the body are not well adapted to prevent a relative inclination of the axle and the vehicle body and are, therefore, unable in curves to successfully stabilize the body against the effect of the centrifugal force. In other words, springs which result in proper riding qualities for a travel along a straight course are too soft for a travel in curves. This applies particularly to heavy vehicles, such as busses, the center of gravity of which is located at a relatively high level.

It is the object of the present invention to provide an improved wheel suspension for such vehicles involving the provision of a stabilizer spring adapted to brace the body against the effect of centrifugal forces without affecting the main spring characteristic.

It is another object of the present invention to provide a simple wheel suspension involving a minimum of elements in which separate springs are provided to counteract the relative up-and-down movement and the relative inclination of the axle and the body of the vehicle. Further objects of the invention are to provide torsional spring rods for restraining such relative movements, such spring rods extending substantially over the whole width of the vehicle beyond the lateral confinements of the longitudinal frame beams, whereby a heavy weight may be transferred to the axle resulting nevertheless in a soft spring arrangement ensuring excellent riding qualities.

Further objects of my invention will appear from a detailed description of a preferred embodiment of my invention following hereinafter. It is to be understood, however, that such detailed description serves the purpose of explanation rather than that of limitation of the invention.

In the drawings,

Fig. 1 is a partial elevation of the wheel suspension, the wheels being omitted, partly in section along the line 1—1 of Fig. 2;

Fig. 2 is a plan view of the wheel suspension shown in Fig. 1 including the wheels, partly in section along the line 2—2 of Fig. 1; and Fig. 3 is a transverse section taken substantially along the line 3—3 of Fig. 1.

The axle on which two twin wheels 19 are journalled comprises a pair of co-axial rigid tubes 18 fixed to a central transmission housing 34 and reinforced by a sheet metal beam 17 formed by a vertical plate welded to the right hand face of the transmission housing 34 and having an upper horizontal flange 36 projecting in the direction away from the transmission housing 34 and a lower horizontal flange 37 extending in the opposite direction. The tubes 18 and the outer ends of the sheet metal beam 17 are fixed to the customary plates not shown on which the brake shoes for the wheels 19 are mounted.

The wheels 19 are attached to and driven by shafts 35 which extend through the tubes 18 into the transmission housing 34 and are geared to a drive shaft 31 which is driven by the engine of the vehicle (not shown).

The chassis includes a pair of longitudinal beams 10 and 11 which are located between the wheels 19 above the axle 17, 18. Furthermore, the chassis includes a pair of brackets 12, 13 which have integral flanges attached to the beams 10 and 11 by bolts and nuts and extend outwardly therefrom. The brackets 12, 13 carry an upper pair of co-axial bushings 20, 21 and a lower pair of co-axial bushings 22, 23. Both pairs of bushings have parallel transverse horizontal axes. A pair of sleeves 24 and 25 is journalled in the upper pair of bushings and projects inwardly and outwardly therefrom, the inner ends of the bushings being spaced from the frame beams 10 and 11. Arms 14 and 15 are fixed to the projecting inner ends of the sleeves 24 and 25 and extend substantially horizontally into proximity with the axle 17, 18. Means are provided constituting a pivotal connection between the arms 14, 15 and the axle. For this purpose, the tubes 18 are formed with two pairs of upstanding spaced ears 38 and 39 accommodating transverse pins 32 extending parallel to the axle and being preferably surrounded by rubber bushings. The ends of the arms 14 and 15 are formed with eyes 40 surrounding such bushings. Preferably, the arms 14 and 15 are formed by sheet metal plates capable of being elastically twisted when the axle rocks relative to the chassis.

From the above it will be appreciated that the arms 14, 15 will guide the axle for up-and-down movement relative to the chassis.

A third sleeve 26 is journalled in the lower pair of bushings 22 and 23 extending beneath the frame beams 10 and 11 and carrying a wishbone link 16 fixed thereto. The wishbone link extends within a plane substantially parallel to the arms 14 and 15 into proximity with the central portion of the axle 17, 18 and is connected thereto by a universal joint which is shown as comprising a spherical head 45 on the end of the wishbone link 16 and a socket bearing 46 attached to the lower face of housing 34. A rubber lining may be inserted between such socket bearing 46 and the spherical head 45 in a known manner. The flange 37 of the sheet metal beam 17 is recessed to accommodate the end of link 16.

Preferably, the distance of the common axis of the pivot pins 32 from the center of the universal joint 45, 46 equals the distance of the axes of the two pairs of bushings 20, 21 and 22, 23. Similarly, the length of the arms 14, 15 equals the length of the wishbone link 16. Thus, the links 14, 15, 16 will be able to properly guide the axle relative to the chassis for up-and-down movement, to brace the axle against lateral thrusts, and to take up the brake couple transferred by the wheel through the brakes to the axle and to transmit the resulting forces to the chassis.

A stabilizer rod 29 constituting a torsional spring is disposed co-axially within the sleeves 24, 25 and has enlarged square heads 41 which are fixed to, i. e. connected for common rotation with, the outer ends of the sleeves 24, 25. For that purpose, the sleeves 24, 25 are formed with internal seats for the square heads 41. The stabilizer rod 29 will not be flexed by and will not restrain any parallel up-and-down movement of the axle 17, 18. However, it will counteract any relative inclination between the axle and the body of the vehicle. Owing to the arrangement described, the length of the stabilizer spring rod 29 will not be substantially less than that of the axle 17, 18. It is highly desirable, of course, to make the torsional spring rods as long as possible in order to secure a soft spring characteristic without unduly increasing the specific stresses in the spring.

The two longitudinal beams 10, 11 can be connected by a transverse beam in form of a tube 42 surrounding and guiding the rod 29 and extending through openings in the side walls of the hollow box-shaped beams 10, 11 being welded to the rims of such openings. Moreover, a transverse sheet metal beam 47 may be disposed between and connected to the longitudinal beams adjacent to the brackets 12, 13.

For the purpose of transferring the load of the body and the chassis 10, 11, 12, 13 to the axle 17, 18, a spring is provided to connect the chassis with the wishbone link 16. Preferably, such spring, too, is formed by a torsional rod 30 mounted within the third sleeve 26 co-axially therewith and having one end fixed to one end of the sleeve 26 and having its other end fixed to the bushing 23. In the embodiment shown the bushing 23 is extended by a tube 28 suitably fixed thereto. For the purposes of the present invention the tube 28 can be looked upon as part of the bushing 23. The torsional rod 30 has enlarged square heads 43 and 44. The head 43 engages suitable seating faces provided in the outer end of sleeve 26, whereas the head 44 engages seating faces provided in the outer end of the tube 28 which is rigid with the bracket 13 and thus forms part of the chassis. Therefore, any rocking motion of the wishbone link will result in a rotation of sleeve 26 and in a torsion of the spring rod 30.

The length of the spring rod 30 is substantially the same as that of of rod 29 being not substantially less than that of the axle 17, 18 and preferably exceeding such length.

Each of the beams 10, 11 is connected to a shock absorber 33 of the telescope type which extends towards the axle and is linked to an eye formed by the lower horizontal flange 37 of axle beam 17.

From the above it will appear that according to the invention a wheel suspension, particularly for busses or other heavy duty vehicles equipped with twin wheels, has been provided in which the rigid axles are guided relatively to the body by links arranged one above the other and adapted to rock about transverse axes, the rocking motion being restrained by torsional springs, preferably spring rods.

In addition to the main spring formed by the spring rod 30, the stabilizer spring 29 has been provided in such a manner that one of the links, to wit the link 16, is sprung relatively to the frame, while the other links 14, 15 are spring-controlled one in relation to the other by the stabilizer rod 29 thus providing for a simple rugged wheel suspension involving a minimum number of parts.

The rigid axle is guided by the pair of links 14, 15 disposed on opposite sides of a central vertical plane of the vehicle acting in conjunction with a third link which is preferably formed as a wishbone link, the co-operating links constituting a parallelogram, said pair of links being connected by the stabilizer rod, while the wishbone link is spring-controlled with respect to the chassis.

The transversely extending torsional spring rods extend beyond the lateral confinements of the frame substantially over the whole width of the vehicle, the projecting ends of the spring rods being disposed within sleeves. The outer ends of the sleeves are fixed to the spring rods, while the inner ends of the sleeves are fixed to the links guiding the axle. Owing to this arrangement, large forces may be transferred by the springs, and the wheel-guiding links may be mounted at a comparatively close distance from the longitudinal vertical central plane of the vehicle and may nevertheless result in a satisfactory suspension of the wheels.

While a preferred embodiment of the invention has been described, it is to be understood that the same is in no way limited to the details thereof, but is capable of numerous modifications within the scope of the appended claims.

What I claim is:

1. In a vehicle, the combination comprising an axle, a pair of wheels mounted thereon and carrying same, a chassis, a pair of lateral links pivoted to said chassis for rocking motion within longitudinal planes of the vehicle and connected to said axle and adapted to guide the same for relative up-and-down movement, a stabilizer spring connecting said lateral links to restrain a relative inclination of said axle and said chassis, a link pivoted to said chassis and engaging the center of said axle, and a spring connecting said chassis with said last mentioned link to restrain the motion of the latter and to transfer the weight of said chassis to said axle.

2. In a vehicle, the combination comprising an axle, a pair of wheels mounted thereon, a chassis, three links pivotally mounted on said chassis for rocking motion about transverse horizontal axes, two of said links being disposed on either side of a central vertical plane of said chassis and being connected to said axle for guiding the same for relative up-and-down movement, a transverse torsional spring rod resiliently connecting said last mentioned links and constituting a stabilizer spring, the third one of said links being a wishbone link engaging the center of said axle, and a second torsional spring rod connecting said wishbone link to said chassis to thereby transfer the load of the chassis therethrough to said axle.

3. In a vehicle, the combination comprising an axle, a pair of wheels mounted thereon, a chassis, a pair of links pivotally mounted on said chassis for rocking motion about a transverse horizontal axis on either side of a central vertical plane of said chassis, means for connecting the ends of said links to said axle, a stabilizer spring rod mounted co-axially to said axis and connected to said links, a wishbone link mounted on said chassis for rocking motion about a transverse horizontal axis located beneath said first mentioned axis, a universal joint provided between said wishbone link and the center of said axle and located beneath said means, and a torsional spring rod mounted on said chassis co-axially with said last mentioned axis, one end of said torsional spring rod being fixed to said wishbone link and the other end of said torsional spring rod being fixed to said chassis.

4. In a vehicle, the combination comprising an axle, a pair of wheels mounted thereon, a chassis, a pair of spaced sleeves journalled in said chassis for rotation about a common transverse horizontal axis, said sleeves having fixed arms extending from the inner ends thereof towards said axle and being pivotally connected therewith and adapted to guide said axle for relative up-and-down movement, a stabilizer spring rod disposed co-axially with and extending into said sleeves and fixed to the outer ends thereof, the length of said stabilizer spring rod being not substantially less than that of said axle, a third sleeve extending parallel to said first mentioned sleeves therebeneath and journalled in said chassis, a wishbone link fixed to said third sleeve and extending substantially parallel to said arms, a universal joint between the end of said wishbone link and said axle, and a torsional spring rod within said second sleeve having one end fixed to one end thereof and having its other end fixed to said chassis, said torsional spring rod having substantially the same length as said stabilizer spring rod.

5. The combination claimed in claim 4 in which each of said arms is formed by a sheet metal plate capable of being elastically twisted.

6. In a vehicle, the combination comprising an axle, a pair of wheels mounted thereon, a chassis including a pair of longitudinal beams located between said wheels above said axle, a pair of brackets attached to said beams and extending outwardly therefrom, said brackets forming an upper pair of co-axial bushings and a lower pair of co-axial bushings having parallel transverse horizontal axes, a pair of sleeves journalled in one of said pairs of bushings and projecting inwardly therefrom, arms fixed to the projecting inner ends of said sleeves and extending into proximity with said axle and being pivotally connected thereto for up-and-down guidance of said axle, a stabilizer rod disposed co-axially within said sleeves and having its ends fixed to the outer ends of said sleeves, a third sleeve journalled in the other one of said pairs of bushings, a wishbone link fixed to said third sleeve and extending into proximity with the central portion of said axle within a plane substantially parallel to said arms, a universal joint between the end of said wishbone link and said axle, and a torsional spring rod mounted within said third sleeve co-axially therewith and having one end fixed to one end of said sleeve and having its other end fixed to one of said last mentioned pair of bushings.

7. The combination claimed in claim 6 in which a pair of shock absorbers of the telescope type is provided, each shock absorber extending between and being attached to one of said beams and said axle.

8. In a vehicle, the combination comprising an axle, a pair of wheels mounted thereon and carrying same, a chassis, link means pivoted to said chassis and engaging the center of said axle, a spring connecting said chassis with said link means to restrain the motion of the latter and to transfer the weight of said chassis to said axle, and spring-controlled stabilizer means mounted on said chassis and engaging said axle at points on either side of and spaced from the center thereof and adapted to counteract a relative inclination of said axle and said chassis.

9. In a vehicle, the combination comprising an axle, a pair of wheels mounted on said axle and carrying same, a chassis, spring-controlled stabilizer means mounted on said chassis and engaging said axle at points on either side of and spaced from the center of said axle to counteract relative inclination of said axle and said chassis, and independent torsion-rod, spring-controlled means extending substantially transversely of said vehicle and connected between said axle and said chassis for restraining motion of said axle only in the central longitudinal vertical plane of the vehicle, said independent torsion rod means being directly connected with one end thereof to said chassis.

10. In a vehicle, the combination comprising an axle, a pair of wheels mounted on said axle and carrying same, a chassis, spring-controlled stabilized means mounted on said chassis and engaging said axle at points on either side of and spaced from the center of said axle to counteract relative inclination of said axle and said chassis, independent torsion-rod, spring-controlled means between said axle and said chassis for restraining motion of said axle only in the central longitudinal vertical plane of the vehicle, said last-named means including link means symmetrically positioned with respect to said plane and disposed at an angle with said plane, and common support means connecting said stabilizer means and said independent torsion-rod, spring-controlled means to said chassis.

References Cited in the file of this patent

UNITED STATES PATENTS

| Number | Name | Date |
|---|---|---|
| 2,069,911 | Bourdon | Feb. 9, 1937 |
| 2,179,016 | Leighton | Nov. 7, 1939 |
| 2,226,047 | Borgward | Dec. 24, 1940 |
| 2,256,069 | Wagner | Sept. 16, 1941 |
| 2,300,844 | Olley | Nov. 3, 1942 |
| 2,413,212 | Brown | Dec. 24, 1946 |
| 2,417,019 | Sherman | Mar. 4, 1947 |
| 2,552,690 | Poirier | May 15, 1951 |

FOREIGN PATENTS

| Number | Country | Date |
|---|---|---|
| 220,146 | Great Britain | Aug. 14, 1924 |
| 652,079 | Great Britain | Apr. 18, 1951 |
| 620,805 | Germany | Oct. 28, 1935 |